US006292773B1

(12) United States Patent
Bernardes et al.

(10) Patent No.: US 6,292,773 B1
(45) Date of Patent: Sep. 18, 2001

(54) APPLICATION-INDEPENDENT LANGUAGE MODULE FOR LANGUAGE-INDEPENDENT APPLICATIONS

(75) Inventors: Marcelo C. Bernardes, Westminster; Cleber D. Giorgetti, Lakewood, both of CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/340,599

(22) Filed: Jun. 28, 1999

(51) Int. Cl.[7] ............................ G06F 17/28; G06F 17/27; H04M 1/64
(52) U.S. Cl. ............................... 704/9; 704/7; 379/88.05
(58) Field of Search ..................................... 704/2–9, 277, 704/258; 379/88, 88.05, 88.06; 707/4

(56) References Cited

U.S. PATENT DOCUMENTS

| 4,595,980 | 6/1986 | Innes ........................................ 704/8 |
| 4,615,002 | 9/1986 | Innes ........................................ 704/8 |
| 4,887,212 | 12/1989 | Zamora et al. .......................... 704/9 |

(List continued on next page.)

FOREIGN PATENT DOCUMENTS

| 0376316 | 7/1990 | (EP) .............................. G06F/15/16 |
| 8902131 | 3/1989 | (WO) ............................. G06F/15/40 |
| 9505630 | 2/1995 | (WO) . |

OTHER PUBLICATIONS

John Kincaide, Computer Telephony, CT Demo & Expo, *Mediasoft's Flexible IVS Studio*, pp. 67–69.
R.C. Steiner, *Translation Of An Initially–Unknown Message*, Lucent Patent Application, Filed Jul. 7, 1997, Ser. # 08/888687.

*Write Code That Is Easy To Internationalize*, on–line document at mk:@ivt:vccore/F3/D6/S4D14D.HTM, (Oct. 6, 1997).

M.C. Bernardes–C.D. Giogetti: *Infrastructure For Developing Application–Independent Language Modules For Language–Independent Applications*, U.S. patent application # 09/340,872, filed Jun. 28, 1999.

*Primary Examiner*—Patrick N. Edouard
(74) *Attorney, Agent, or Firm*—David Volejnicek (57) ABSTRACT

An application-independent language module for language-independent applications responds to a request from an application identifying a concept that is generic to a plurality of languages and the language that the concept is to be expressed in, by generating and returning an expression of the identified concept in the identified language for the application to communicate. The language module is implemented in object-oriented programming form and includes instances of the following foundation class objects that are provided by an infrastructure for language module development: a concept object for defining the generic concepts in a language-independent manner and pointing to concept definitions each defining the corresponding concept in a different language, a concept definition object for defining the concepts in language-dependent manner and pointing to parsers each for expressing a part of an expression of the concept in the language of the concept definition and associating any variables that are involved in the concept with parsers, and a parser object for expressing parts of the concept expressions and values of any associated variables in the languages of the concept definitions. Variables are defined at the concept level. Also included are foundation classes for languages, variables, and data types. The development infrastructure further includes an application program interface (API) for creating, modifying, and deleting class instances in a database compilable into the language module repository, and a database of media fragments for forming communicable versions of the concepts.

34 Claims, 10 Drawing Sheets

U.S. PATENT DOCUMENTS

| | | | |
|---|---|---|---|
| 4,949,302 | 8/1990 | Arnold et al. | 707/200 |
| 5,083,268 | 1/1992 | Hemphill et al. | 704/9 |
| 5,339,240 | 8/1994 | Beaverson | 707/531 |
| 5,339,421 | 8/1994 | Housel, III | 709/328 |
| 5,375,164 | 12/1994 | Jennings | 379/88.05 |
| 5,386,556 | 1/1995 | Hedin et al. | 707/4 |
| 5,428,772 | 6/1995 | Merz | 707/4 |
| 5,651,095 | 7/1997 | Ogden | 704/257 |
| 5,678,039 | 10/1997 | Hinks et al. | 704/8 |
| 5,737,617 | 4/1998 | Bernth et al. | 704/9 |
| 5,787,275 | 7/1998 | Li | 707/103 |
| 5,805,775 | 9/1998 | Eberman et al. | 704/9 |
| 5,875,422 * | 2/1999 | Eslambolchi et al. | 704/3 |
| 5,960,382 * | 9/1999 | Steiner | 704/2 |
| 6,058,166 * | 5/2000 | Osder et al. | 379/88.22 |
| 6,154,527 * | 11/2000 | Poeter et al. | 379/88.18 |

* cited by examiner

FIG. 1

| U.S. ENGLISH APPLICATION 114a | MANDARIN APPLICATION 114b |
|---|---|
| BEGIN:<br>1.) ANSWER PHONE<br>2.) ANNOUNCE<br>    PHRASE: WELCOME TO YOUR BANK<br>. . .<br>. . .<br>10.) PROMPT & COLLECT<br>    PHRASE: FOR SAVINGS,<br>    PHRASE: PRESS 1,<br>    PHRASE: FOR CHECKING,<br>    PHRASE: PRESS 2,<br>    . . .<br>. . .<br>15.) GET HOST DATA<br>. . .<br>. . .<br>20.) ANNOUNCE<br>    PHRASE: ON<br>    FIELD: TODAY_DATE AS DMY<br>    PHRASE: YOU HAVE<br>    FIELD: BALANCE_1 AS N$<br>    PHRASE: IN YOUR<br>    PHRASE: SAVINGS ACCOUNT<br>. . .<br>. . .<br>99.) DISCONNECT | BEGIN:<br>1.) ANSWER PHONE<br>2.) ANNOUNCE<br>    PHRASE: WELCOME TO YOUR BANK<br>. . .<br>. . .<br>10.) PROMPT & COLLECT<br>    PHRASE: PRESS 1<br>    PHRASE: FOR SAVINGS,<br>    PHRASE: PRESS 2,<br>    PHRASE: FOR CHECKING,<br>    . . .<br>. . .<br>15.) GET HOST DATA<br>. . .<br>. . .<br>20.) ANNOUNCE<br>    FIELD: BALANCE_1 AS N$D2<br>    PHRASE: YOU HAVE<br>    PHRASE: IN YOUR<br>    PHRASE: SAVINGS ACCOUNT<br>    FIELD: TODAY_DATE AS DDMSPY<br>    PHRASE: ON<br>. . .<br>. . .<br>99.) DISCONNECT |

(PRIOR ART)

APPLICATION-INDEPENDENT LANGUAGE MODULE FOR LANGUAGE-INDEPENDENT APPLICATIONS

CROSS-REFERENCE TO A RELATED APPLICATION

This application has a common disclosure with U.S. application Ser. No. 09/340,872, filed on even date herewith and assigned to the same assignee.

TECHNICAL FIELD

This invention relates to arrangements for automatically generating messages, such as voice and text announcements, in any of multiple variations, e.g., languages.

BACKGROUND OF THE INVENTION

Automated message-generating arrangements have a wide range of applications. For example, in interactive voice-response systems, they are used to generate messages for playback to a user which either provide the user with information or prompt the user for action.

The design and use of the message-generating arrangement is relatively simple if only one language is supported. For example, the sentence structure required for any announcement is known a-priori, thereby making the construction of announcements relatively simple. However, even if only one language is supported, there is still a problem of entering information that is context-dependent or user-dependent into the announcements. An example of context-dependent information is singular versus plural terms. An example of user-dependent information is date information: "day/month" order in some cultures versus "month/day" order in others.

As a result of language-, culture-, or market-specific variations in representing information, the design of the message-generating arrangement usually is language-, culture-, or market-specific. But this limits use of the arrangement to only the particular market, culture, or language for which it was designed, and different designs must be created for each market, culture and language. This is very expensive and highly inefficient.

To avoid this problem, efforts have been made to design message-generating arrangements that are language-, culture-, or market-independent. For example, U.S. Pat. No. 5,375,164 discloses a voice-messaging system whose design is based upon "semantic expressions" that are used to evaluate language-, culture-, or market-specific data. While effective, this design still does not separate the "semantic expressions" from associated application code to the extent needed to make the design completely application-independent and therefore completely versatile and generic.

SUMMARY OF THE INVENTION

This invention is directed to solving these and other problems and disadvantages of the prior art. Generally according to the invention, there is provided an application-independent language module for language-independent applications. The language module responds to a request identifying a concept that is generic to a plurality of languages and also identifying the language that the concept is to be expressed in by generating and returning an expression of the identified concept in the identified language. All grammar and syntax of the concept in the identified language is defined by the language module. The language module thus separates and hides all language dependencies from applications, while preferably the language module is application-independent. The term "language" is used broadly throughout to include culture and market as well as other contexts that affect the expression of concepts.

According to one aspect of the invention, a communications method comprises the following steps. The language module receives identification of a concept that is generic to a plurality of languages, and of a language that the concept is to be expressed in, from an application that needs to communicate the identified concept in the identified language. In response, the language module generates an expression of the identified concept in the identified language from stored information, and provides the generated expression to the application for communicating the expression. The application is consequently independent of languages including the identified language, and may be used to express the concept in any language for which the language module has the stored information. Preferably, the language module is also independent of applications including this application, and may be used with any application that can identify to the language module a concept and a language for which the language module has the stored information. Illustratively, the provided expression identifies stored media fragments and their order that form a communicable version of the concept, and the application obtains the identified media fragments from a database of stored media fragments and communicates them in the identified order. The language module is thus made media-independent and can be used to generate expressions of concepts in any media (e.g., voice, text, etc.)

According to another aspect of the invention, the language module comprises a plurality of stored concept definitions each defining a concept that is generic to a plurality of languages in a language-dependent manner and pointing to parsers each for expressing a portion of an expression of the concept in the language of the concept definition, and further associating any variables that are involved in the concept with the parsers. The language module also comprises a plurality of the stored parsers for expressing portions of the expressions of the concepts in the languages of the corresponding concept definitions and for expressing values of any variables associated with the parsers in the languages of the corresponding concept definitions. The language module further includes a means (a program interface, for example) for receiving identifications of any one of the concepts and of a language that the concept is to be expressed in, and values of any variables involved in the concept, and in response for returning an expression of the identified concept in the identified language. A further means (a processing engine, for example) of the language module responds to the received identifications by accessing a stored concept definition that corresponds to the received identifications, responds to the accessed concept definition by using the parsers pointed to by the accessed concept definition to express the portions of the expression in the identified language, including expressing any values of any said variables in the identified language by using any said parsers associated with any said variables. Illustratively, the language module is implemented in object-oriented programming form where the above-characterized stored entities are object instances of foundation classes (prototype objects) that are also included in the language module.

The language module further preferably comprises a plurality of stored concept objects each representing a different one of the concepts in a language-independent manner and pointing to the concept definitions that define the corresponding concept in language-dependent manners.

The processing engine responds to the received concept and language identifications by accessing a concept object that corresponds to the identified concept and determining therefrom the concept definition that corresponds to the identified concept and language.

According to yet another aspect of the invention, a communications method involving an application that uses the language module comprises the following steps. The application identifies to the language module a concept that is generic to a plurality of languages and a language that the concept is to be expressed in, in response to needing to communicate the identified concept in the identified language. In response, the application receives from the language module an expression of the identified concept in the identified language, and in response the application communicates the received expression of the concept. The application is thus independent of languages, including the identified language. Illustratively, the received expression identifies media fragments and their order that form a communicable version of the concept, and the application obtains the identified media fragments from a database of media fragments and communicates those media fragments in the identified order.

The invention encompasses both methods that comprise the above-characterized steps and apparatuses that include the above-characterized elements or effect the method steps. The latter apparatus preferably includes an effector—any entity that effects the corresponding step, unlike a means—for each step. Further, the invention encompasses computer-readable media containing instructions which, when executed in a computer, either cause the computer to perform the method or cause the computer to embody the apparatus.

These and other features and advantages of the invention will become more apparent from the following description of an illustrative embodiment of the invention considered together with the drawing.

DETAILED DESCRIPTION

Figure 1:
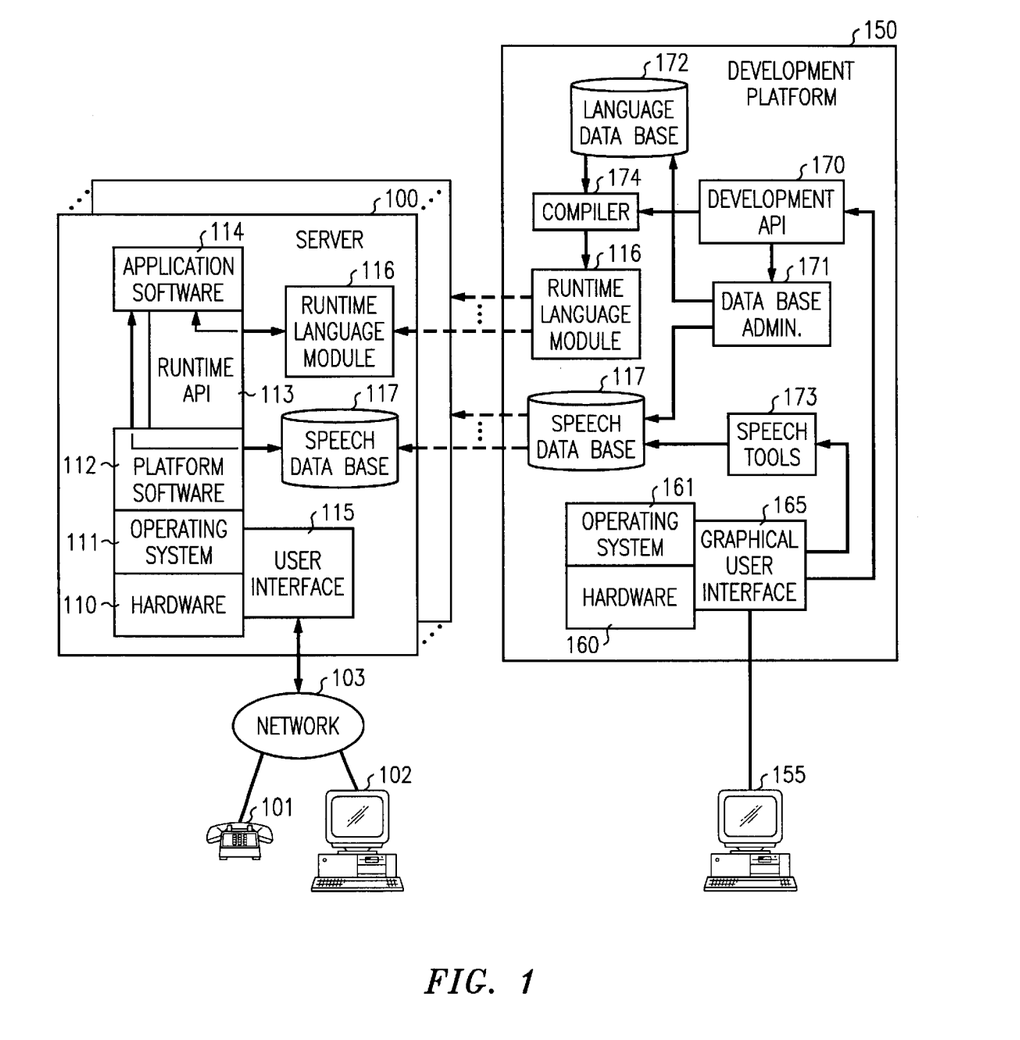
FIG. 1 is a block diagram of a message-generation arrangement that includes an illustrative embodiment of the invention.

FIG. 1 shows a message-generation arrangement that includes an illustrative embodiment of the invention. The arrangement includes a server 100 that provides services to users through their communications terminals 101–102, such as telephones 101 and data terminals or personal computers 102. Terminals 101–102 are connected to server 100 via a communications network 103, such as a local area network (LAN), the Internet, or a public or a private telephone network. Server 100 is a stored program-controlled device. It comprises hardware 110, including a processor for executing programs and a memory for storing the programs, an operating system 111 that controls the operation of server 100, platform software 112 that provides basic, generic, services to users and to application software, and application software 114 which implements the high-level services provided by server 100 to users. Users' terminals 101–102 interact with server 100 through a user interface 115, such as a telephony user interface (TUI) comprising telephone line and trunk port circuits and associated signaling, or a graphical user interface (GUI).

As described so far, server 100 is conventional. For example, elements 110–112 and 115 together comprise the Lucent Technologies Inc. Conversant® voice information system, and elements 110–112 and 114–115 together comprise the Lucent Technologies Inc. Intuity™ messaging system.

Additionally, server 100 comprises a run-time application program interface (API) 113, a run-time language module 116, and a speech database (DB) 117. Alternatively, database 117 may define another medium, e.g., text, or a plurality of media. Run-time API 113 interfaces application software 114 to run-time language module 116. Application software 114 is also interfaced to speech database 117 by the platform software 112. Elements 116 and 117 can be located at any level of the software hierarchy (i.e., at the level of any of elements 111, 112, and 114). During normal operation, when application software 114 determines the concept (any information, including any prompt for user input) that it needs to communicate to a user, it requests run-time language module 116 via run-time API 113 to provide the precise expression of the concept that will properly convey that information. After run-time language module 116 specifies the expression, application software 114 accesses speech DB 117 via platform software 112 and retrieves therefrom the speech, text, or other media fragments specified by module 116 that are needed to compose a communicable version of the concept's expression and causes the expression to be sent to the user. Elements 113 and 116–117 are described in more detail further below.

The message-generation arrangement of FIG. 1 further includes a development platform 150 which is used to develop run-time language module 116 and speech DB 117 of server 100. Development platform 150 is a stored program-controlled device. It comprises hardware 160, including a processor for executing programs and a memory for storing the programs, an operating system 161 that controls the operation of platform 150, and a graphical user interface (GUI) 165 through which a developer's terminal or computer 155 interacts with platform 150. As described so far, platform 150 is conventional. Illustratively, hardware 160 comprises a personal computer (PC) or a workstation, and operating system 161 and GUI 165 together comprise a Windows-type operating system.

Additionally, platform 150 includes a development API 170, database administration 171, a language DB 172, speech tools 173, and compiler 174. Database administration 171 is a conventional database manager that is a function of which databases (e.g., Oracle, Informix, etc.) are selected for databases 117 and 172. Speech tools 173 are conventional tools that are conventionally used to develop a speech DB of speech fragments from which voice messages are composed at run-time. If the messages are desired to be in a medium other than voice, e.g., text, graphics, video, or multi-media, speech tools 173 change accordingly so as to facilitate the development of a database of fragments of the desired medium or media. A developer interfaces with speech tools 173 via GUI 165 in order to generate the contents of speech DB 117.

Language DB 172 stores all rules needed to construct expressions of concepts in each language and/or for each culture or market that have been defined by language DB 172 developers. Run-time language module 116 is an executable version of language DB 172 compiled by compiler 174. Language DB 172 is composed of a framework, which is a database representation of the structure of languages, and of language data, which are the data that define individual languages. Significantly, the framework is language-, culture-, and market-independent. The framework of language DB 172 thus presents a model of a language in which any language and any culture- or market-dependent variants thereof can be represented.

Figure 2:
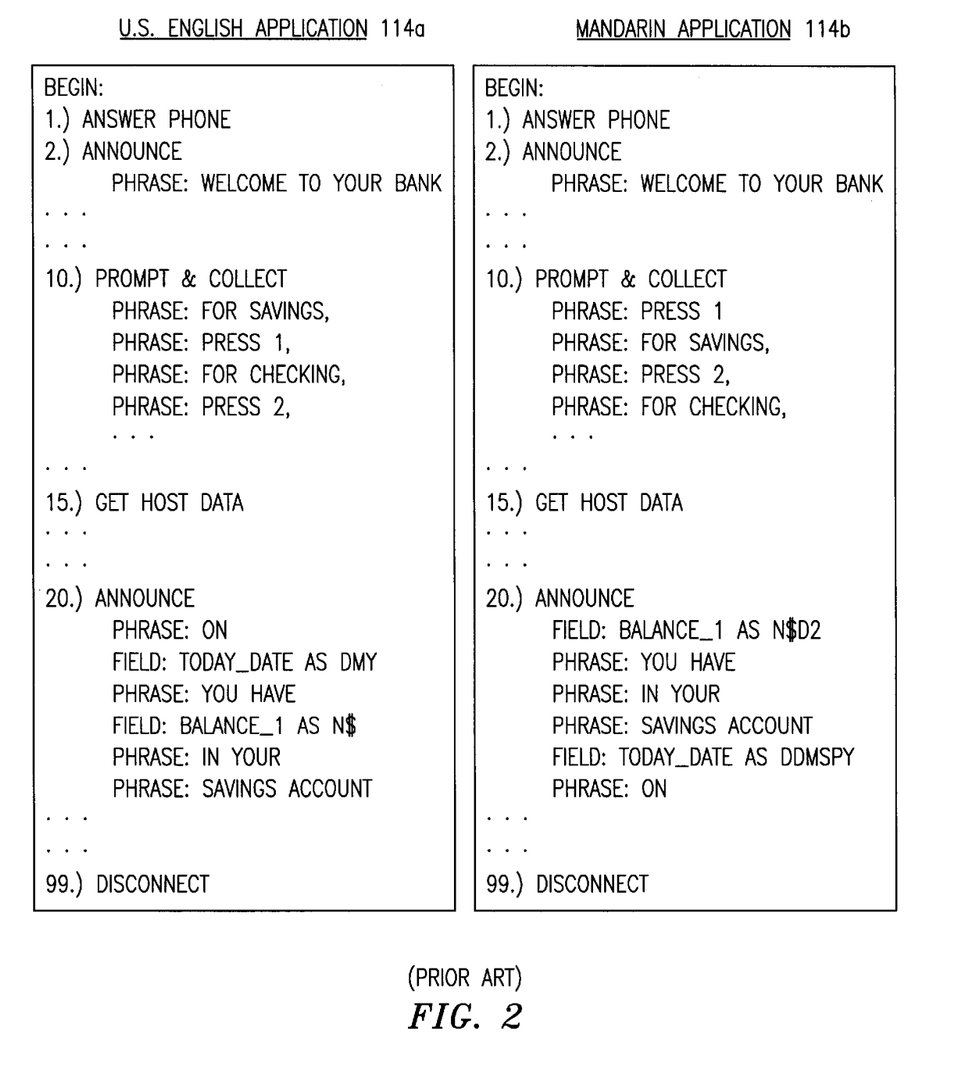
FIG. 2 is a functional diagram of two illustrative prior-art applications that implement the same functionality in two different languages.

Turning now to FIG. 2, an application 114a or 114b may be viewed as comprising two major distinct types of information: application logic and culture logic. Application logic is the approach used to provide the desired functionality to end-users (e.g., interact with a caller to a bank to provide the caller with an account balance). It is represented in FIG. 2 by the numbered statements. It includes the implementation of business rules (the need that the application is filling). It is coded and developed by an application specialist (a programmer). The culture logic is the approach used to communicate with end-users (e.g., U.S. English or Mandarin). It is represented in FIG. 2 by the indented statements. It includes user-interface standards (e.g., Graphical User Look Listen and Feel (GULLF)). It is developed by a language specialist (a linguist). Each one of these types of information has its own dynamics for development, reuse, and maintenance. So, although they are inter-dependent, they should not be intra-dependent (i.e., they are components of the same application, but the application logic should not be intertwined or directly interact with the culture logic, and vice versa). How this objective is met is illustrated in FIG. 3.

Figure 3:
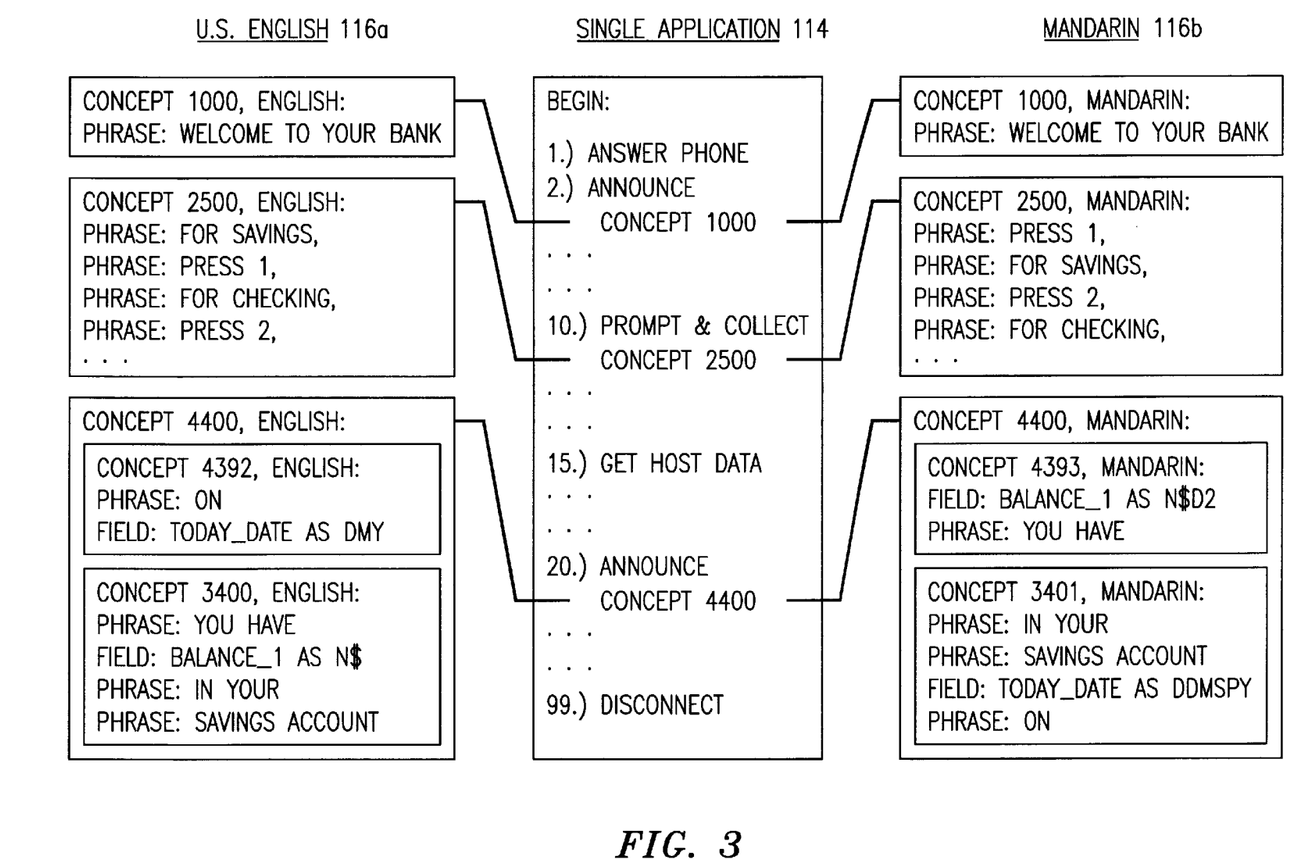
FIG. 3 is a functional diagram of a single illustrative application constructed according to the invention that implements the functionality of the two applications of FIG. 2.

To meet this objective, we provide a self-contained language module 116 that contains all language-dependent, culture-dependent and market-dependent logic, designated as 116a and b in FIG. 3, and no application logic (i.e., the contents of module 116 are language-dependent but application-independent) so that application 114 contains only application logic and no culture logic (i.e., application 114 is language-independent but application-dependent), as shown in FIG. 3. Application 114 provides all context information to the language module 116, and language module 116 provides all language information back to application 114. A usage example, showing how this is accomplished, is given in FIG. 4. Via runtime API 113, application 114 provides a request 400 to language module 116 identifying a particular concept (4400), the language in which that concept is to be expressed (English), the medium in which the concept is to be expressed (recorded speech), and values of variables ($today_date and $balance_1) used by the concept. Concepts are generic to a plurality (illustratively all) languages. Via runtime API 113, language module 116 provides a response 401 that lists a sequence of fragment identifiers in speech database 117 which, when they are retrieved via platform software 112 from speech database 117 and are voiced in the indicated sequence, result in the appropriate announcement being communicated, e.g., "On Apr. 15, 1998, you have three hundred dollars in . . . ".

Figure 5:
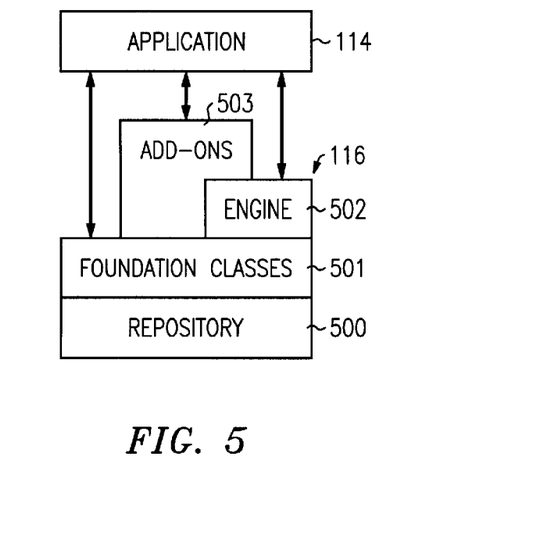
FIG. 5 is a block diagram of the language module of the arrangement of FIG. 1.

Shown in FIG. 5, language module 116 comprises a repository 500, foundation classes 501, and an engine 502. Repository 500 is a store (e.g., a database) of object instances that contains all language-related information (language resources) for use by one or more applications, and a conventional database manager. All grammar and syntax information for all defined concepts in all defined languages is stored in repository 500. Foundation classes 501 are definitions of prototype objects that can be instantiated to allow the developer of the language module (e.g., a language developer) to describe the language resources. They enable the developer to represent language-dependent information in object-oriented programming form, in a way that facilitates use by different applications, to map external representations of information into corresponding representations internal to repository 500, and to access the language resources in repository 500. Engine 502 is either a library or a stand-alone processing program that allows either the developer to manipulate the contents of repository 500 or an application 114 to access the contents of repository 500 through an application programming interface (API) without directly using foundation classes 501. Optionally, language module 116 may further include add-ons 503, such as libraries or stand-alone programs that extend the basic language-module functionality to allow a developer to perform repository and media-related information creation and management. Add-ons 503 may implement one or more of the following capabilities. Application simulation, which allows a developer to test the repository prior to its use with an application, and supports language resource development without requiring an actual application to support the resource development. Media check, which verifies that all media-dependent information accessed by an application is actually available in the run-time environment. Repository migration, which enables the repository and all media-related information to be moved between and managed in different development environments and installed in the run-time environment. Media conversion, which converts media-dependent language resources from a variety of different formats into a format suitable for use in the run-time environment. Support of batching, which batches a list of media-dependent information that is to be presented to the user simultaneously. Media proxy, which allows the application simulation to obtain and use media-dependent information obtained through a network. And support for speech recording (e.g., a sound card), which permits a developer to generate media-dependent language resources, such as speech files.

Figure 6:
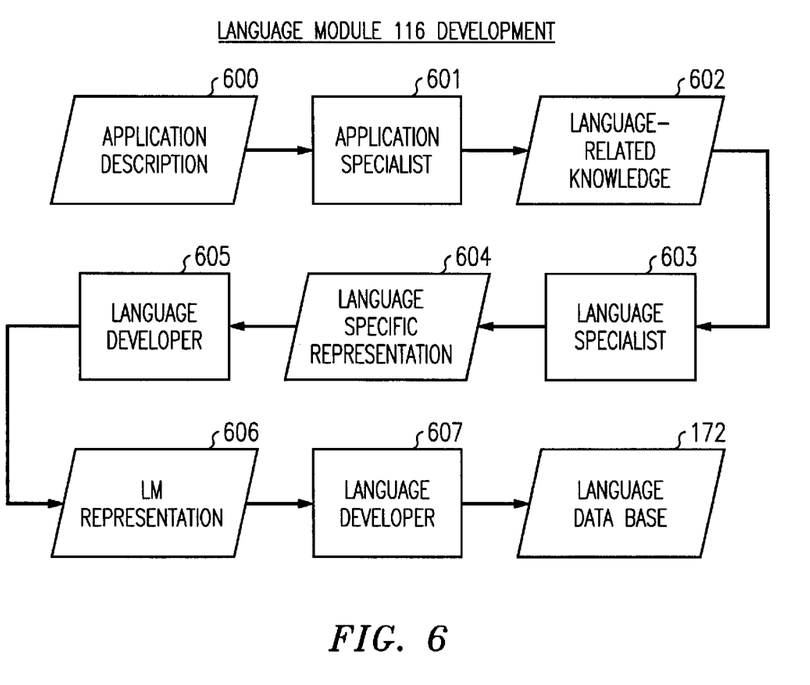
FIG. 6 is a functional flow diagram of the process of developing language data contents of the language module of the arrangement of FIG. 1.

The following is a brief description of the process through which the repository gets populated with language resources as illustrated in FIG. 6. From a description 600 of what an application 114 needs to accomplish, an application specialist 601 specifies the language-related knowledge 602 comprising language elements (e.g., prompts, announcement) that are required by the application and the languages (e.g., English, Spanish, French, Japanese) that the application will use. A language specialist 603 defines a language-specific representation 604 of the language elements in each language that will be used by the application. The developer 605 of the language module 116 structures the language-specific information 604 in a language-module (LM) representation 606 that is reusable by (i.e., is generic to) all of the languages used by the application. The language module developer 605 then stores the results in language database 172 (see FIG. 1).

Language database 172 has an associated manager-database administration 171—which is dependent upon the particular database being used and which performs conventional database management functions (e.g., manages accesses to the language resources). The language resources that populate language database 172 include instances of the following foundation class objects 501:

- A language, which posits, or defines the existence of, a language in the repository. It comprises a language ID and a language name, both of which are preferably defined consistently with ISO 639/ISO 3166.
- A concept, which posits, or defines the existence of, a concept in a language-independent manner. It comprises a concept ID, a concept description which is a text description of the purpose of the concept, a concept scope that defines who has access rights to this concept (e.g., application developers, language developers, or both), and a concept variable list that lists the variables that are used as input and output parameters by this concept and the order in which the variables must be presented to this concept. Via the concept ID, it identifies or points to all language-specific definitions of the posited concept.
- A concept definition, which defines how to implement a specific concept in a specific language; it ties a language and a concept together. It comprises a concept definition component list which lists the language components (e.g., words, phrases) that are used to implement the concept and their order, and a concept definition-to-component-variable mapping that maps the language components to the corresponding variables in the corresponding concept variable list. Not every language component needs to correspond to a variable; a variable can correspond to only one language component. The language components are expressed by parsers, and the concept definition component list points to the specific parsers that implement the expression of the corresponding concept in the corresponding language.
- A parser, which defines how to convert input data (a portion, e.g., a phrase, of the concept expression, including the value of any input variable) to language fragments of a specific language (and vice versa). A parser may (but may not) accept an input, and generates a syntactically and semantically correct output in the target language and data type that it represents. As in other computer science contexts, a parser here is an entity that determines the syntactic structure of a language unit by decomposing it into more elementary sub-units and establishing the relationships among the sub-units. For example, to decompose blocks into statements, statements into expressions, and expressions into operators and operands. In this illustrative example, the output takes the form of a sequence of one or more fragment identifiers of fragments in speech database 117. A parser can also be viewed as a dynamic-concept definition.
- A data type, which defines a type of data (e.g., integer, character, undefined, etc.) in the same manner as is common in computer programming languages.
- A variable, which defines a variable ID and its data type, in the same manner as is common in computer programming languages.

In language database 172, languages are constructed from concept definitions. Individual concept definitions may in turn be constructed from other, simpler, concepts. Concepts are in turn constructed from concept definitions, data types, and variables.

In its simplest form, an object is a unit of information. In an object-oriented programming environment, an object contains both attributes and method describing how the content is to be interpreted and/or operated on.

Foundation class objects 501 provide the framework to development API 170 for creating the language resources and populating language database 172 therewith. With respect to each foundation class, the API 170 provides functions to create, modify, or remove (delete) instances of the foundation class object. The create functions check if the identified instance already exists, and if so, deny permission to create it. The modify functions and the remove functions guarantee referential integrity between the candidate for modification or removal, respectively, and any other entities that refer to it. If other entities do refer to it, the developer is forced to modify or remove them before modifying or removing the candidate.

The development API 170 includes the following basic functions.

| Function | Development API 170 Definition |
| --- | --- |
| engine_id. add Language (Language) | Makes a new language known to the database manager and thus available to users. It checks if the language already exists. |
| engine_id.modifyLanguage (Language, newInformation) | Changes an existing language. It checks if the new language's information is valid/consistent. |
| engine_id.removeLanguage (Language) | Removes an existing language. It checks the impact this removal will have on the language module's referential integrity, and requests actions to guarantee its referential integrity. |
| Language (language-ID, language-name) | Creates a wrapper (a data structure) for a new language with an ID and a descriptive language name. Language-ID may include a language version or other relevant information. |
| engine_id. addConcept (Concept) | Makes a new concept known to the database manager and thus available to users. It checks if the concept already exists. |
| engine_id.modifyConcept (Concept, newInformation) | Changes an existing concept. It checks if the new concept's information is valid/consistent. |
| engine_id.removeConcept (Concept) | Removes an existing concept. It checks the impact that this removal will have on the language module's referential integrity, and requests actions to guarantee its referential integrity. |
| Concept (concept-ID, concept-scope, concept-description) | Creates a wrapper for a new concept with an ID for the new concept, indication of the scope of access to this concept, and a natural-language description of the concept. |
| concept_id.isDefined (language) | Verifies if this concept has already been defined for this language and returns a value indicative thereof. |
| concept_id.addVariable (Variable) | Inserts a new variable into the existing concept. This variable can then be associated with parsers. The order of variables in which they are added to the concept defines the order in which their values must be. input. |

| Function | Development API 170 Definition |
|---|---|
| concept_id.modifyVariable (Variable, new Information) | Changes an existing concept's variable. It checks if the new variable's information is valid/consistent. |
| concept_id. removeVariable(Variable) | Removes an existing concept's variable. It checks the impact that this removal will have on the language module's referential integrity, and requests actions to guarantee its referential integrity. |
| Variable(variableId, variableType) | Creates a wrapper for a new variable with an ID for the new variable and a data type of this variable. This variable can then be added to existing concepts. |
| concept_id. addConceptDefinition (Concept Definition) | Adds a new concept definition to an existing concept. If this concept definition contains a parser, it can be associated with one of this concept's variables. |
| concept_id. modifyConceptDefinition (ConceptDefinition, newInformation) | Changes an existing concept's concept definition. It checks if the new concept definition's information is valid/consistent. |
| concept_id. removeConceptDefinition (ConceptDefinition) | Removes an existing concept's concept definition. It checks the impact that this removal will have on the language module's referential integrity, and requests actions to guarantee its referential integrity. |
| conceptDefinition(Concept, Language) | Creates a wrapper for a new concept definition for the given concept and language. This concept definition is then added to the corresponding concept. |
| conceptDefinition_id.add ConceptElement(Concept) | Adds a new concept to a concept definition. This concept is then part ot the concept definition. The order of the elements (concepts & parsers) defines their output order. |
| conceptDefinition_id. addParser (Parser) | Adds a new parser to to an existing concept definition. This parser can then be associated with variables. |
| conceptDefinition_id. modifyParser (Parser, newInformation) | Changes an existing parser. It checks if the new parser's information is vaild/consistent. |
| conceptDefinition_id. removeParser (Parser) | Removes an existing parser. It checks the impact that this removal will have on the language module's referential integrity, and requests actions to guarantee its referential integrity. |
| conceptDefinition_id. associate Parser Variable (Parser-ID, Variable-ID) | Associates an existing variable with an existing parser. This variable's value will henceforth be parsed using this parser. |
| Parser (parserId) | Creates a wrapper for a new parser with an ID for the new parser. |
| engine_id. getParser(parserID) | Retrieves an existing parser from the repository. |
| engine_id. addDataType(DataType) | Adds a new data type. This data type can then be associated with variables. |
| engine_id. modifyDataType (DataType, newInformation) | Changes an existing data type. It checks if the new data type's information is valid/consistent. |
| engine_id. removeDataType (DataType) | Removes an existing data type. It checks the impact that this removal will have on the language module's referential integrity, and requests actions to guarantee its referential integrity. |
| DataType(dataTypeID) | Creates a wrapper for a new data type with an ID for the new data type. |

Figure 7:
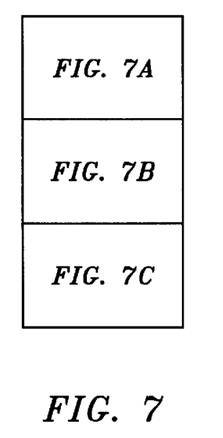
FIGS. 7A–C are a functional flow diagram of a language developer's illustrative portion of the language module development process of FIG. 6.
Figure 7A:
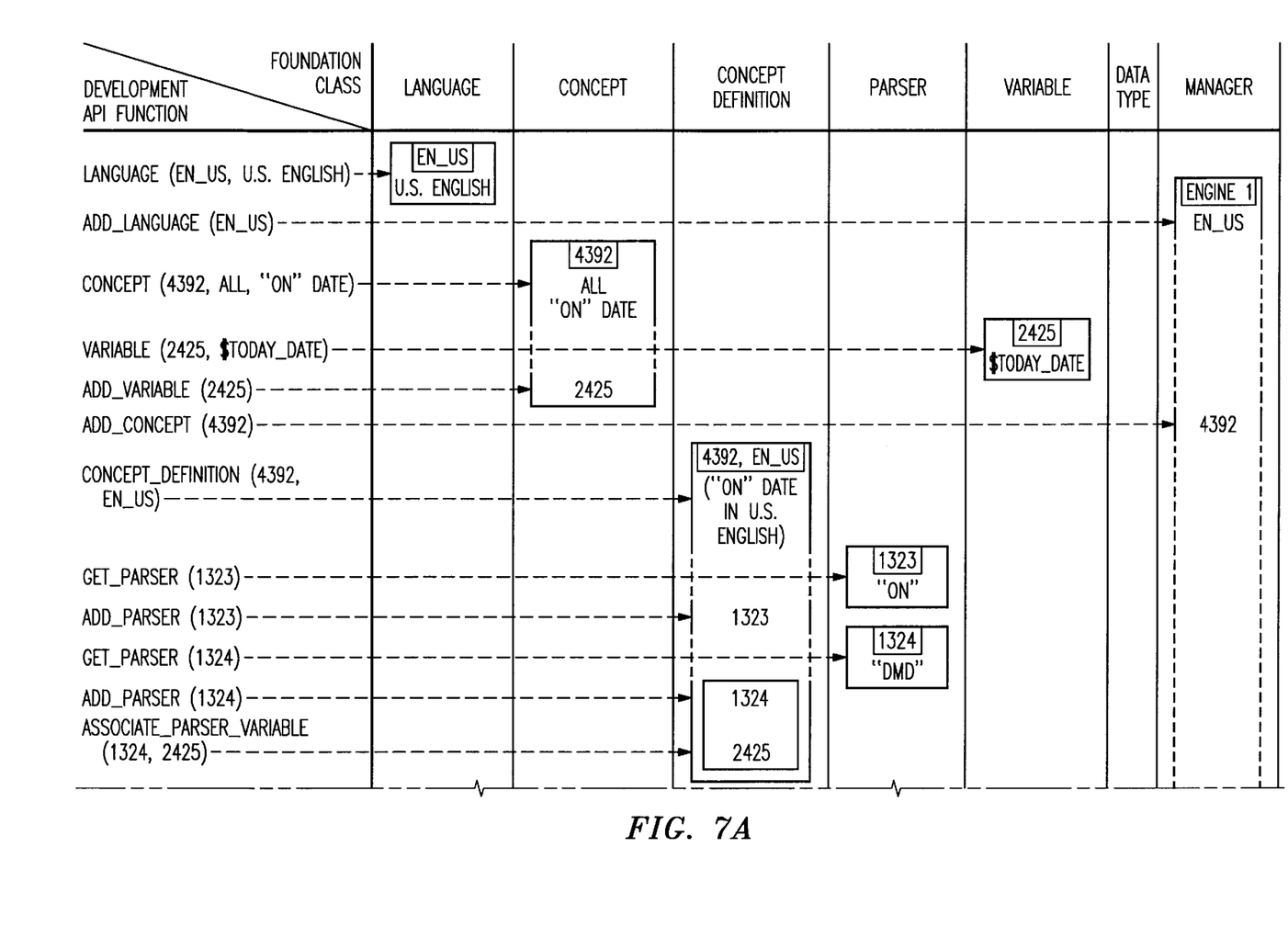
Figure 7B:
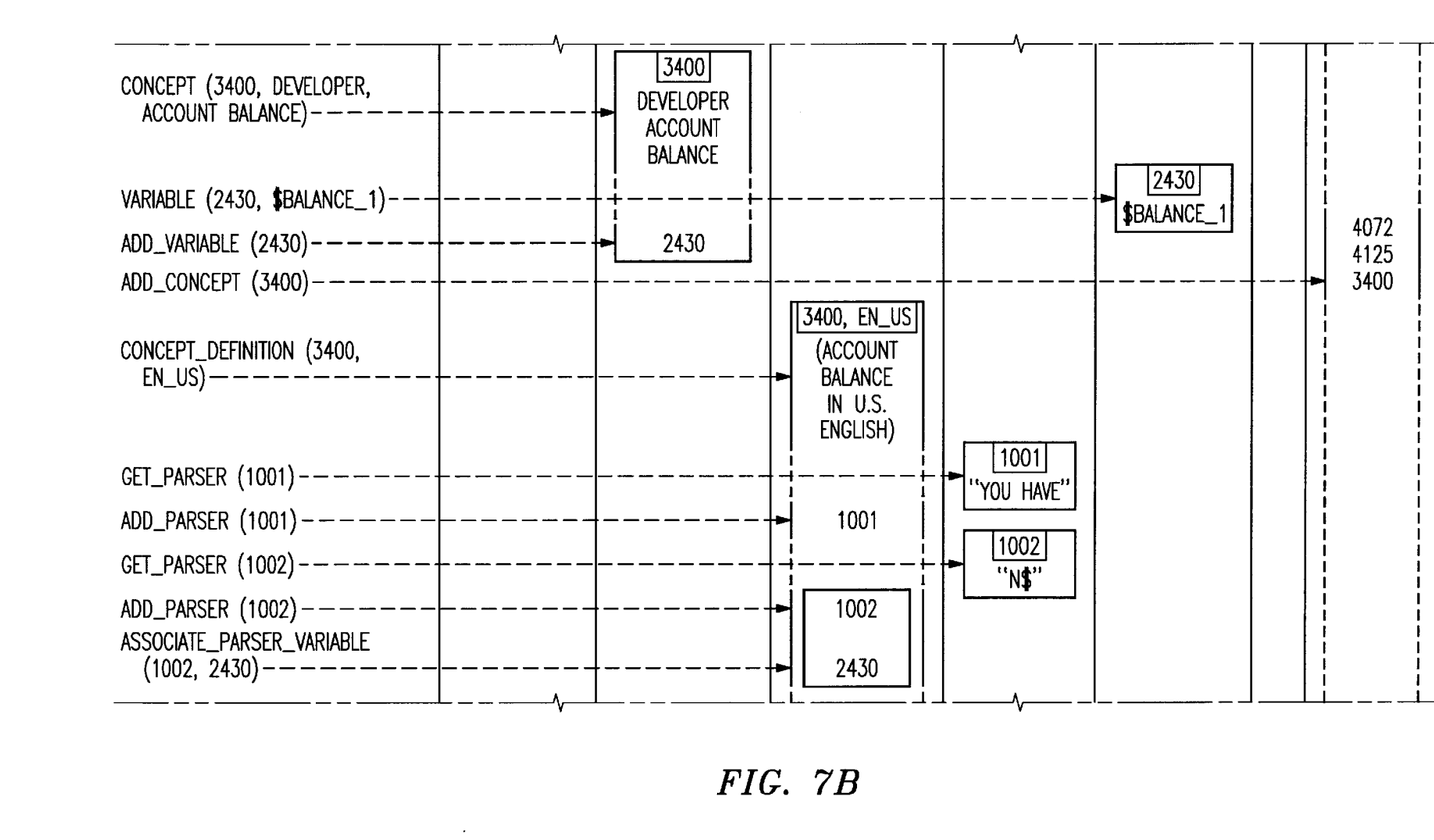
Figure 7C:
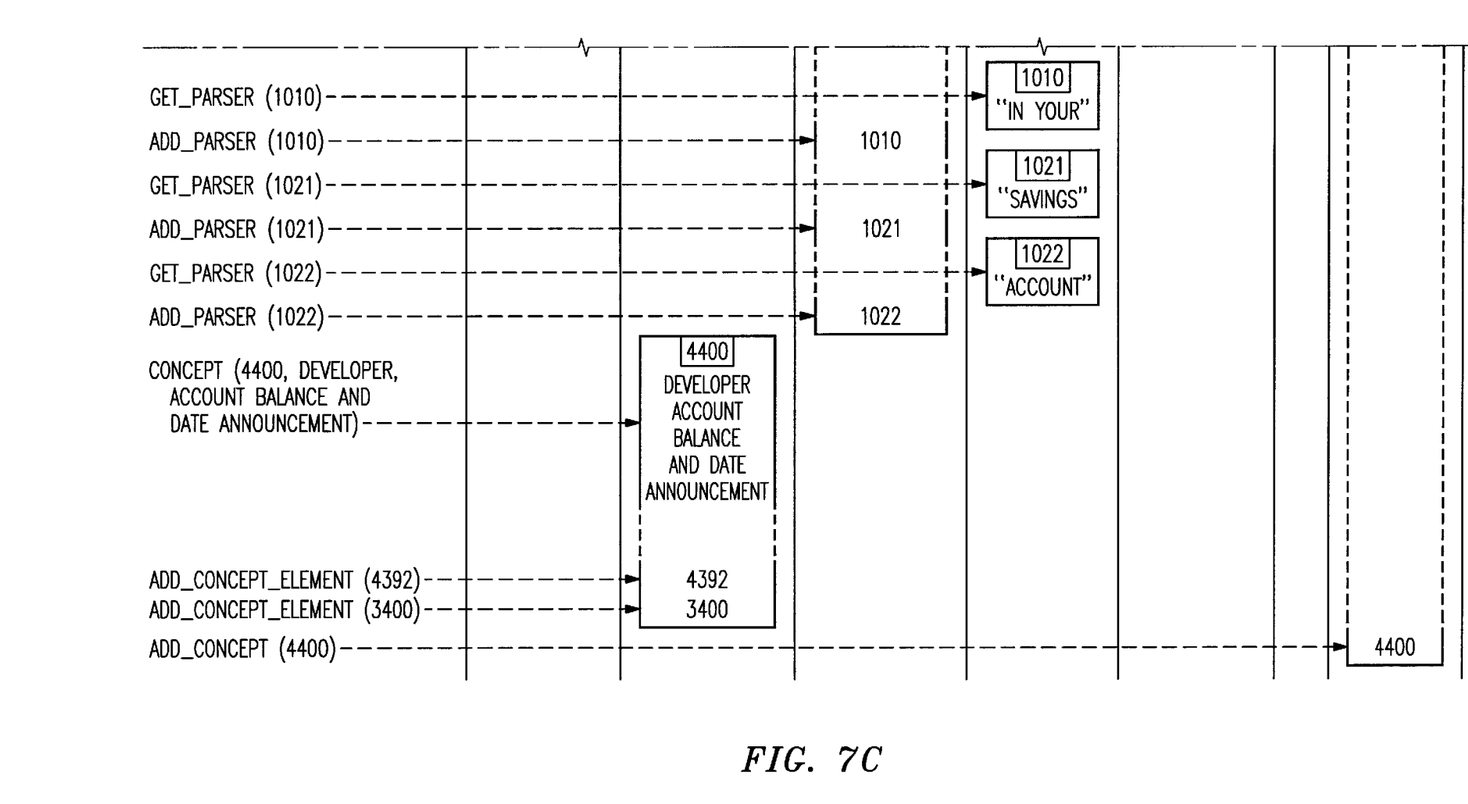

FIG. 7 illustrates the use of the development API 170 to create in language database 172 the language resources needed for the announcement "On (today's date) you have (balance) in your savings account" in U.S. English.

Once the developer has created language DB 172 for a particular language, the developer causes compiler 174 to compile language DB 172 into executable code, which populates repository 500 of runtime language module 116 (see FIG. 5). For example, if language DB 172 is an object-orientated database, the compilation is as simple as a direct data dump (copy) of language DB 172 into repository 500 of module 116.

Once runtime language module 116 has been created, it is available for use by application software 114. Interaction between the two is via runtime API 113, which is supported by engine 502 and includes the following basic functions.

| Function | Runtime API 113 Definition |
|---|---|
| manager_id.getLanguages( ) | Returns all available languages for this manager instance |
| manager_id.getConcepts(Language) | Returns all available concepts for this manager instance |
| manager_id.getMedia( ) | Returns all available media for this manager instance. |
| manager_id. parse(Language, Concept, Medium, VariablesValuesList) | Returns a list of fragments of the given medium that represent an expression of the given concept in the given language. If the concept has variables, these variables'values are provided in the order specified in the concept. The parse accomplishes this by passing the variables values list to the method parse of the concept definition instance corresponding to the specified language. The result is then converted to the specified medium. |

Figure 4:
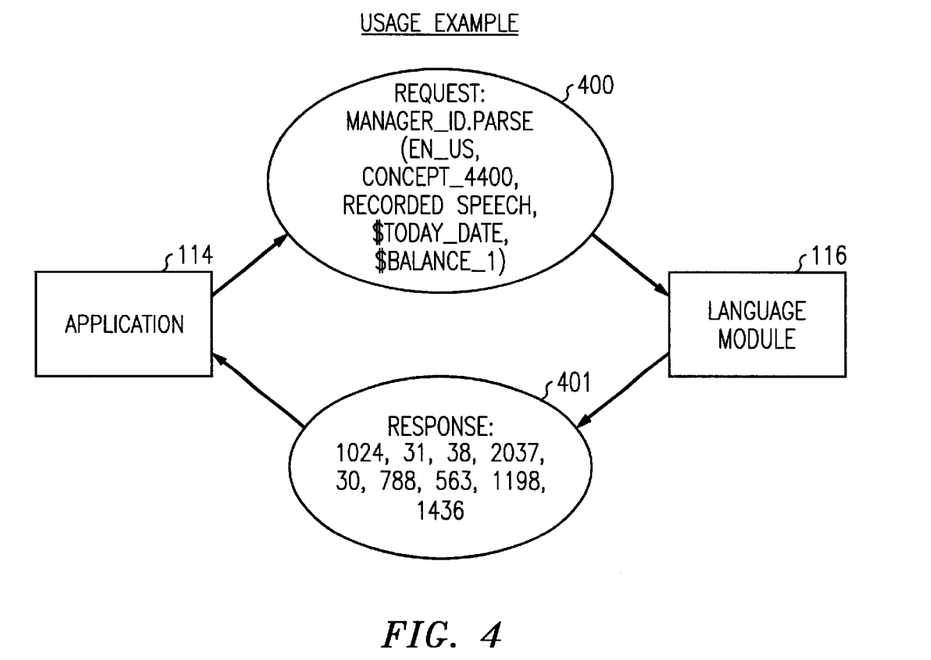
FIG. 4 is a functional flow diagram of interactions between the application of FIG. 3 and the language module of the arrangement of FIG. 1.
Figure 8:
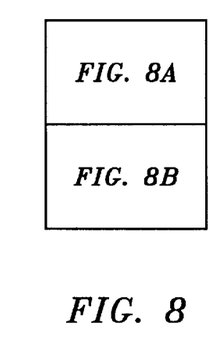
FIGS. 8A–B are a functional flow diagram of an illustrative parse method of the runtime API of the arrangement of FIG. 1.
Figure 8A:
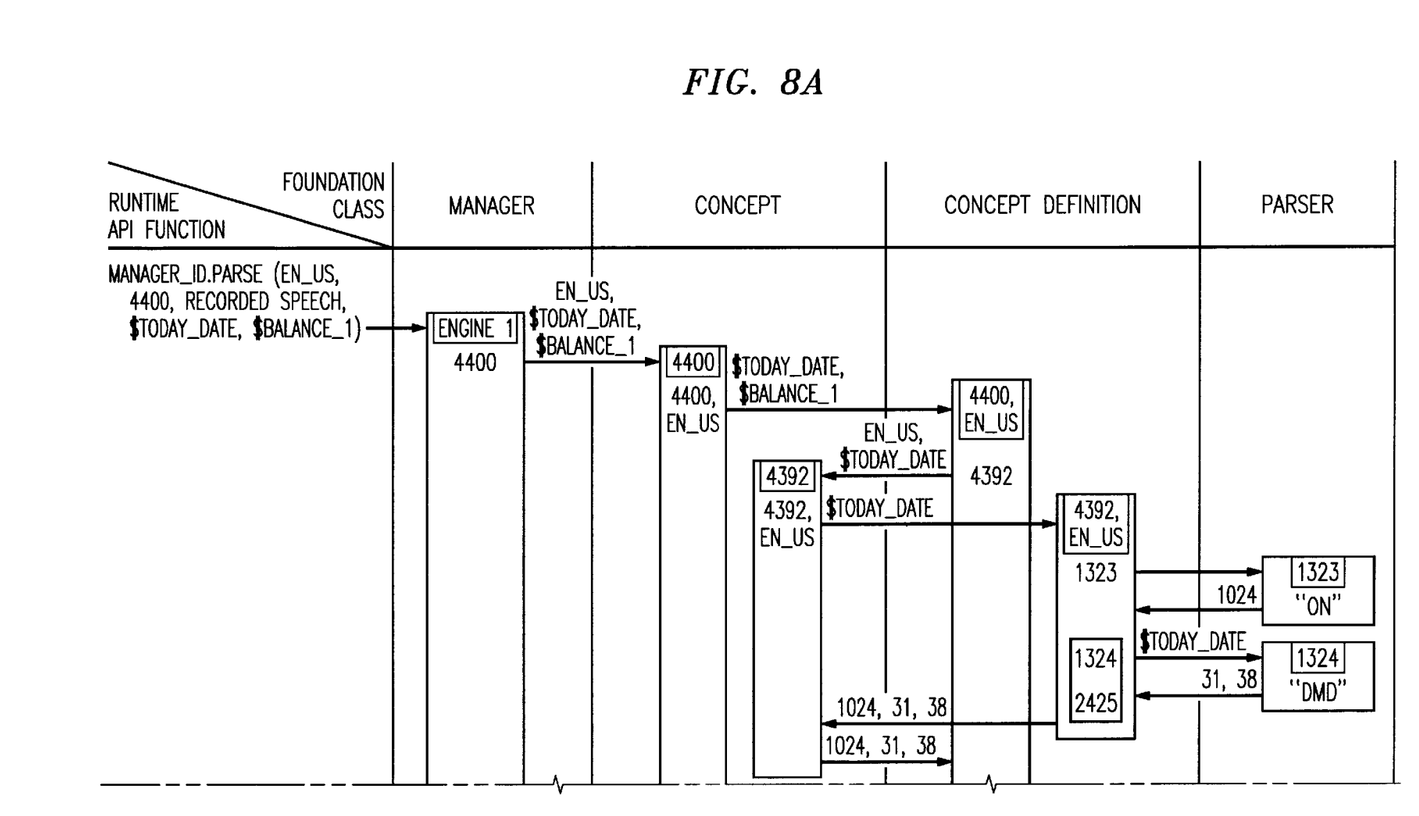
Figure 8B:
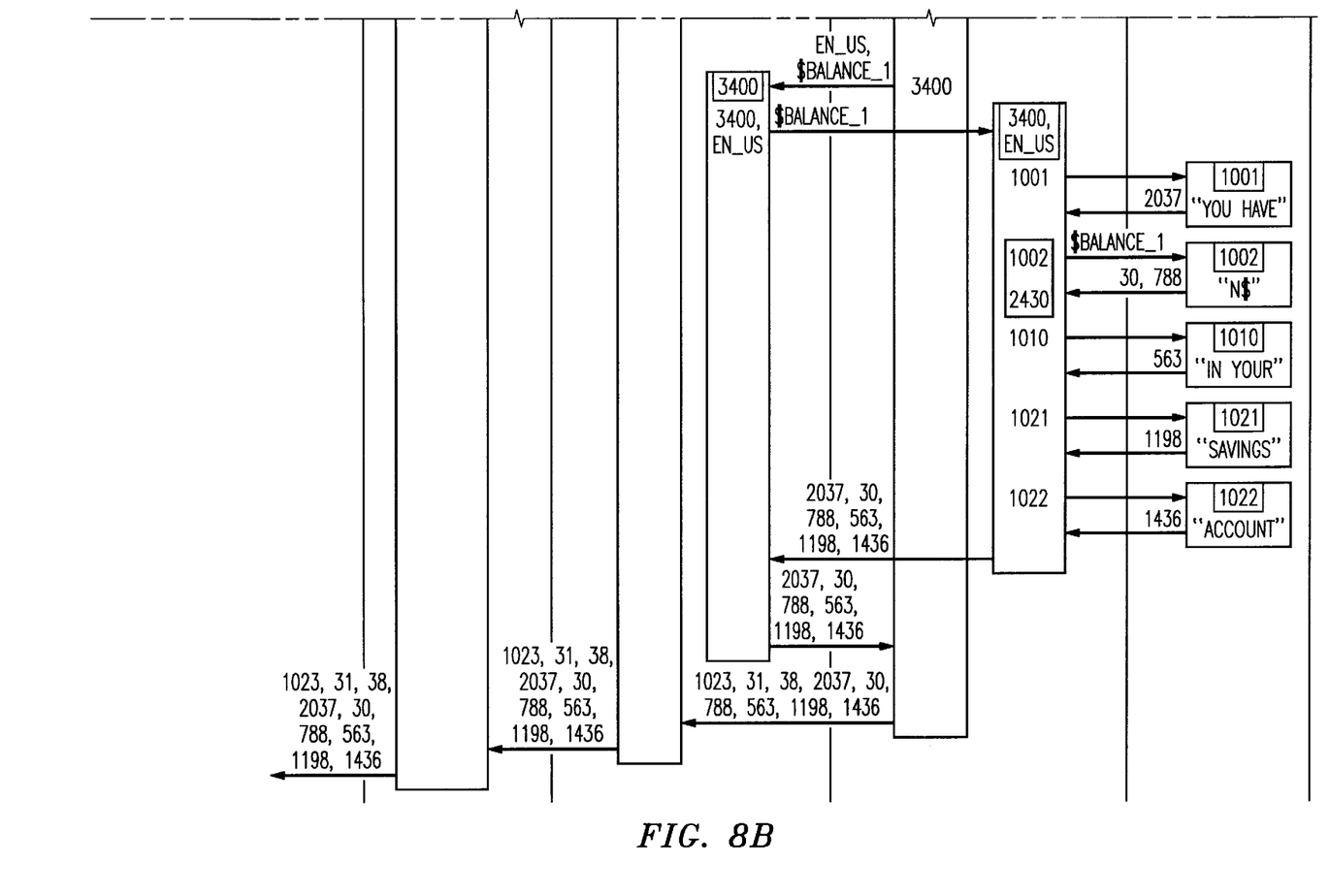

The first three functions (method calls) apply only to manager instances, and involve communication from application 114 to the manager and back again. The fourth function, representing the parse method, involves at the highest level communication from application 114 to the manager, from the manager to the indicated concept definition, from the concept definition to a parser, from the parser back to the concept definition and therefrom to the manager, and finally from the manager back to application 114. An example of the parse method implementing the usage example of FIG. 4 is shown in FIGS. 8A–B.

Of course, various changes and modifications to the illustrative embodiment described above will be apparent to those skilled in the art. For example, definitions, naming of functions, and passing of parameters in the APIs may be changed as necessary to adapt to a particular programming environment. The media may change as desired, and the information passed back by the language module may change accordingly: for example, it can pass back text directly instead of fragment pointers. Also, the database structure may be changed; for example, to add legacy information for backwards compatibility. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A communications method comprising:

receiving an identification of a concept that is generic to a plurality of languages and of a language that the concept is to be expressed in from an application needing to communicate the identified concept in the identified language;

in response, a language module accessing a stored concept object which corresponds to the identified concept, said concept object being common to the plurality of languages, representing the identified concept in a language-independent manner, and pointing to all stored language-specific concept definition objects that correspond to the identified concept;

further in response, the language module accessing the stored concept definition object that is pointed-to for the identified language by the accessed concept object, each stored concept definition object that is pointed to by the accessed concept object defining the identified concept for an individual language of the plurality of languages and identifying components of the individual language that express the identified concept in the individual language;

the language module generating an expression of the identified concept in the identified language from stored information including the pointed-to language-specific concept definition object for the identified language and the language components identified by the pointed-to concept definition object; and providing the generated expression to the application for communicating the expression.

2. The method of claim 1 wherein:

the application is independent of languages including the identified language; and the language module is independent of applications including said application.

3. The method of claim 1 wherein:

the provided expression identifies stored media fragments and their order that form a communicable version of the concept.

4. The method of claim 3 further comprising:

the application obtaining the media fragments from a database of stored media fragments; and the application communicating the obtained media fragments in the identified order.

5. The method of claim 1 wherein:

the stored information includes concept objects and concept definition objects of a plurality of concepts, including the identified concept, each concept definition object corresponding to an individual language.

6. The method of claim 1 wherein:

the stored information includes concept objects and concept definition objects of a plurality of concepts, including the identified concept, each concept object being common to a plurality of languages, including the identified language.

7. The method of claim 1 wherein:

all grammar and syntax of the concept in the identified language is defined by the corresponding concept definition object and the language components pointed to by the corresponding concept definition object.

8. The method of claim 1 wherein:

receiving an identification of a concept includes receiving a value of a variable;

accessing the stored concept definition comprises accessing the pointed-to concept definition, which maps the variable to a corresponding one of the identified language components;

generating includes composing an expression of the variable's corresponding language component including the value of the variable, in the identified language; and the communicating includes communicating the expression of the variable's corresponding language component including the expression of the value of the variable.

9. The method of claim 5 wherein:

the concept definition object identifies the language components by identifying at least one parser that corresponds to the language components and is included in the stored information; and the language module uses the identified at least one parser to express the language components in the identified language.

10. The method of claim 1 wherein:

the expression of the concept in the identified language comprises a plurality of the language components; and the language components are each expressed in the identified language by a corresponding parser included in the stored information.

11. The method of claim 8 wherein:

the variable has a corresponding parser included in the stored information; and the value of the variable is expressed in the identified language by the corresponding parser.

12. The method of claim 1 wherein:

receiving is preceded by the step of the application identifying to the language module the concept that is generic to the plurality of languages and the language that the concept is to be expressed in, in response to needing to communicate the identified concept in the identified language; and providing is succeeded by the steps of in response to the providing, the application receiving from the language module the expression of the identified concept in the identified language, and in response, the application communicating the received expression of the concept, so that the application is independent of languages including the identified language.

13. The method of claim 12 wherein:

the received expression identifies media fragments and their order that form a communicable version of the concept; and communicating comprises the application obtaining the media fragments identified by the received expression from a database of media fragments, and the application communicating the obtained media fragments in the identified order.

14. The method of claim 12 wherein:

all grammar and syntax of the concept in the identified language is defined by the language module.

15. The method of claim 12 wherein:

identifying includes the application specifying a value of a variable;

receiving includes receiving an expression of the value of the variable in the identified language; and communicating includes communicating the received expression of the value of the variable.

16. A language module that enables applications to communicate concepts in language-independent manner, comprising:

storage means storing a plurality of concept definitions each defining a concept that is generic to a plurality of languages in a language-dependent manner and pointing to parsers each for expressing a portion of an expression of the concept in the language of the concept definition and further associating any variables that are involved in the concept with the parsers, and a plurality of concept objects each common to the plurality of languages, representing a different corresponding generic concept in a language-independent manner, and identifying all of the stored concept definitions that define the corresponding concept for different languages;

a plurality of said parsers for expressing portions of the expressions of the concepts in the languages of the corresponding concept definitions and for expressing values of any variables associated with the parsers in the languages of the corresponding concept definitions;

means for receiving identification of any one of the concepts and of a language that the identified concept is to be expressed in and also receiving values of any variables involved in the identified concept, and in response returning an expression of the identified concept in the identified language; and means cooperative with the receiving means and the storage means, responsive to the received identifications for accessing a stored concept object that corresponds to the identified concept, for accessing the stored concept definition identified by the accessed concept object and that corresponds to the identified language, and responsive to the accessed concept definition for using the parsers pointed to by the accessed concept definition to express the portions of the expression of the identified concept in the identified language, including expressing any values of any said variables in the identified language by using any said parsers associated with any said variables.

17. The language module of claim 16 wherein:

all grammar and syntax of each said concept in each said language is defined by contents of the storage means.

18. The language module of claim 16 wherein:

the storage means further stores a plurality of variable objects each defining one of the variables as corresponding to a particular data type;

a plurality of data type objects each defining a particular type of data; and at least one language objects each defining an individual language.

19. The language module of claim 16 in combination with a database of media fragments, wherein:

the returned expression identifies the media fragments and their order forming a communicable version of the identified concept in the identified language.

20. The method of claim 19 wherein:

the language module is independent of applications including said application.

21. A language module that enables applications to communicate concepts in language-independent manner, comprising:

storage means storing a plurality of concept definitions each defining a concept that is generic to a plurality of languages in a language-dependent manner and pointing to parsers each for expressing a portion of an expression of the concept in the language of the concept definition and further associating any variables that are involved in the concept with the parsers, a plurality of concept objects each representing a different one of the concepts in a language-independent manner and identifying the concept definitions of the represented concept for different languages, and a plurality of said parsers for expressing portions of the expressions of the concepts in the languages of the corresponding concept definitions and for expressing values of any variables associated with the parsers in the languages of the corresponding concept definitions;

means for receiving identification of any one of the concepts and of a language that the concept is to be expressed in and also receiving values of any variables involved in the concept, and in response returning an expression of the identified concept in the identified language; and means cooperative with the receiving means and the storage means, responsive to the received identification of the concept and the language for accessing the concept object that corresponds to the identified concept, determining therefrom the concept definition that corresponds to the identified concept and language, accessing the determined concept definition, and responsive to the accessed concept definition for using the parsers pointed to by the accessed concept definition to express the portions of the expression of the identified concept in the identified language, including expressing any values of any said variables in the identified language by using any said parsers associated with any said variables.

22. An apparatus for carrying out the method of one of the claims 12–15.

23. A computer-readable medium containing instructions which, when executed in a computer, cause the computer to perform the method of one of the claims 12–15.

24. A communications method comprising:

receiving an identification of a concept that is generic to a plurality of contexts and of a context that the identified concept is to be expressed within, from an application needing to communicate the identified concept within the identified context;

in response, a language module accessing a stored concept object which corresponds to the identified concept, said concept object being common to the plurality of contexts, representing the identified concept in a context-independent manner, and pointing to all stored context-specific concept definition objects that correspond to the identified concept;

further in response, the language module accessing the stored concept definition object that is pointed to for the identified context by the accessed concept object, each stored concept definition object that is pointed to by the accessed concept object defining the identified concept for an individual context of the plurality of contexts and identifying components of language that express the identified concept in the individual context;

the language module generating an expression of the identified concept for the identified context from stored information including the pointed-to context-specific concept definition object for the identified context and the language components identified by the pointed-to concept definition object; and providing the generated expression to the application for communicating the expression.

25. The method of claim 24 wherein:

the stored information includes a plurality of concept objects each representing a different one of the concepts in a context-independent manner and identifying all of the concept definition objects of the corresponding concept for different contexts; and accessing the identified stored concept object comprises in response to the identifications of the concept and the context, accessing the concept object that corresponds to the identified concept and determining therefrom the concept definition that corresponds to the identified concept and context.

26. The method of claim 24 wherein:

the context comprises at least one of a language of expression and a medium of expression.

27. The method of claim 24 wherein:

the application is independent of contexts including the identified context; and the language module is independent of applications including said application.

28. The method of claim 24 wherein:

the concept definition object identifies the language components by identifying at least one parser that corresponds to the language components and is included in the stored information; and the language module uses the identified at least one parser to express the corresponding language components within the identified context.

29. A language module that enables applications to communicate concepts in context-independent manner, comprising:

storage means storing a plurality of concept definition objects each defining a concept that is generic to a plurality of contexts in a context-dependent manner and identifying components of language that express the generic concept in the corresponding context, and a plurality of concept objects each common to the plurality of contexts, representing a different corresponding concept in a context-independent manner, and identifying all of the stored concept definition objects that define the corresponding concept for different contexts;

means for receiving identification of any one of the concepts and of a context that the identified concept is to be expressed in, from an application needing to communicate the identified concept within the identified context, and in response providing an expression of the identified concept for the identified context to the application for communicating the expression; and means cooperative with the receiving means and the storage means, responsive to the received identifications for accessing the stored concept object which corresponds to the identified concept, for accessing the stored concept definition object identified by the accessed stored concept object and that corresponds to the identified context, and responsive to the accessed concept definition object for generating an expression of the identified concept for the identified context from stored information including the pointed-to context-specific concept definition object for the identified context and the language components identified by said concept definition object.

30. The language module of claim 29 wherein:

the stored information includes a plurality of concept objects each representing a different one of the concepts in a context-independent manner and identifying all of the stored concept definition objects of the corresponding concept for different contexts; and the accessing means respond to the received identification of the concept and the context by accessing the concept object that corresponds to the identified concept and determining therefrom the concept definition object that corresponds to the identified concept and context.

31. The language module of claim 29 wherein:

the context comprises at least one of a language of expression and a medium of expression.

32. The language module of claim 29 wherein:

the storage means further store a plurality of parsers for expressing corresponding language components;

the concept definition object identifies the language components by identifying at least one parser corresponding to the language components; and the language module uses the identified at least one parser to express the corresponding language components within the identified context.

33. An apparatus for carrying out the method of one of the claims 1–6, 7–11, and 22–26.

34. A computer-readable medium containing instructions which, when executed in a computer, cause the computer to perform the method of one of the claims 1–6, 7–11, and 22–26.

* * * * *